(12) United States Patent
Donnelly et al.

(10) Patent No.: US 11,635,030 B2
(45) Date of Patent: Apr. 25, 2023

(54) COMPRESSOR BLEED APPARATUS FOR A TURBINE ENGINE

(71) Applicant: General Electric Company, Schenectady, NY (US)

(72) Inventors: Stephen Raymond Donnelly, Wilmington, MA (US); Masato Nakanishi, Boston, MA (US); Joseph Capozzi, North Reading, MA (US)

(73) Assignee: General Electric Company, Schenectady, NY (US)

( * ) Notice: Subject to any disclaimer, the term of this patent is extended or adjusted under 35 U.S.C. 154(b) by 495 days.

(21) Appl. No.: 15/620,904

(22) Filed: Jun. 13, 2017

(65) Prior Publication Data

US 2018/0355877 A1 Dec. 13, 2018

(51) Int. Cl.
| | |
|---|---|
| *F02C 9/18* | (2006.01) |
| *F02C 3/04* | (2006.01) |
| *F01D 17/10* | (2006.01) |
| *F02C 6/08* | (2006.01) |
| *F04D 29/52* | (2006.01) |
| *F04D 17/02* | (2006.01) |

(52) U.S. Cl.
CPC .............. *F02C 9/18* (2013.01); *F01D 17/105* (2013.01); *F02C 3/04* (2013.01); *F02C 6/08* (2013.01); *F04D 29/522* (2013.01); *F04D 17/025* (2013.01); *F05D 2250/323* (2013.01); *F05D 2250/324* (2013.01)

(58) Field of Classification Search
CPC ..................................... F02C 9/18; F02C 6/08
See application file for complete search history.

(56) References Cited

U.S. PATENT DOCUMENTS

| | | | |
|---|---|---|---|
| 4,844,689 A | 7/1989 | Seed | |
| 4,928,479 A | 5/1990 | Shekleton et al. | |
| 5,203,162 A | 4/1993 | Burge | |
| 5,209,633 A * | 5/1993 | McGreehan | F04D 29/542 |
| | | | 415/144 |
| 5,531,565 A | 7/1996 | Meindl et al. | |
| 7,207,352 B2 | 4/2007 | Sadil | |
| 72,707,352 | 4/2007 | Sadil | |

(Continued)

FOREIGN PATENT DOCUMENTS

| | | |
|---|---|---|
| CN | 101169137 A | 4/2008 |
| EP | 2362079 | 8/2011 |

(Continued)

OTHER PUBLICATIONS

Unofficial English Translation of Chinese Office Action issued for CN Application No. 20180607635.6 dated Nov. 4, 2019.

*Primary Examiner* — Todd E Manahan
*Assistant Examiner* — Sean V Meiller
(74) *Attorney, Agent, or Firm* — Fitch, Even, Tabin & Flannery LLP (57) ABSTRACT

A compressor bleed apparatus includes: a compressor comprising one or more rotors mounted for rotation about a central axis and enclosed in a compressor casing; a bleed slot passing through the compressor casing; an outer wall defining, in cooperation with the compressor casing, a plenum surrounding the compressor casing; at least one offtake pipe communicating with the plenum; and wherein at least one of the plenum and the bleed slot has a non-axisymmetric structure.

9 Claims, 11 Drawing Sheets

(56) References Cited

U.S. PATENT DOCUMENTS

| | | | |
|---|---|---|---|
| 7,390,167 B1 | 6/2008 | Bouiller et al. | |
| 7,455,498 B2 | 11/2008 | Zysman | |
| 7,455,798 B2 | 11/2008 | Zysman | |
| 7,788,931 B2* | 9/2010 | Tatebayashi | F01D 9/045 |
| | | | 60/782 |
| 8,388,308 B2* | 3/2013 | Karafillis | F04D 29/522 |
| | | | 415/145 |
| 8,893,512 B2 | 11/2014 | Donahoo et al. | |
| 9,103,281 B2 | 8/2015 | King et al. | |
| 2008/0101922 A1 | 5/2008 | Schirle et al. | |
| 2015/0292358 A1* | 10/2015 | Ronan | F01D 25/24 |
| | | | 415/110 |
| 2015/0292410 A1* | 10/2015 | Suciu | F01D 25/12 |
| | | | 60/39.15 |
| 2016/0069215 A1 | 3/2016 | Hatfield | |
| 2016/0169241 A1* | 6/2016 | Walker | F04D 27/023 |
| | | | 60/805 |
| 2017/0248155 A1* | 8/2017 | Parker | F04D 29/682 |
| 2017/0248156 A1 | 8/2017 | Parker et al. | |

FOREIGN PATENT DOCUMENTS

| | | |
|---|---|---|
| EP | 2993313 | 9/2016 |
| JP | H0763199 A | 3/1995 |
| JP | H0874603 | 3/1996 |
| WO | 2013162672 | 10/2013 |

\* cited by examiner

COMPRESSOR BLEED APPARATUS FOR A TURBINE ENGINE

BACKGROUND OF THE INVENTION

This invention relates generally to turbomachinery compressors and more particularly relates to air bleeds from such compressors.

A gas turbine engine includes, in serial flow communication, a compressor, a combustor, and turbine collectively constituting a turbomachinery core. The core is operable in a known manner, in conjunction with other engine components, to perform useful work such as providing propulsive thrust or mechanical work.

It is known to extract or "bleed" a portion of the air flowing through the compressor in order to make use of it for purposes such as: controlling the compressor cycle, cooling components within the engine, effectuating clearance control, or supplying environmental control systems of an aircraft.

Typically in the prior art, bleed air is extracted through an annular array of bleed slots formed in a casing of the compressor. These are surrounded by an outer chamber or plenum which collects the bleed air. One or more chamber offtake pipes are provided that collect the bleed air from the plenum and deliver it to a downstream location.

It is desired to maintain a uniform mass flow rate and static pressure at all circumferential locations around the compressor casing. This is because the compressor is very sensitive to the static pressure, and variations in the static pressure can adversely affect operating parameters of the compressor such as its stall margin and operability characteristics.

One problem with prior art compressors is that the presence of the chamber offtake pipe causes non-uniformity around the circumference of the plenum. The basic reason for this is that the chamber offtake pipe serves as a "pressure sink". More specifically, the mass flow through the bleed slots is generally greater near the location of the chamber offtake pipe, and the static pressure is generally lower near the location of the chamber offtake pipe. This inverse relationship of flow and static pressure is due to the basic Bernoulli relation.

It would be possible to minimize the nonuniformity around the circumference of the plane of by providing a large number of chamber offtake pipes. However in practice, this increases the parts count, weight, complexity, and cost of the engine and therefore usually only two or one offtake pipes are provided. This increases the non-uniform effect.

BRIEF DESCRIPTION OF THE INVENTION

This problem is addressed by a compressor bleed apparatus having bleed slots arranged in a non-axisymmetric structure configured to result in a substantially uniform static pressure around a compressor casing.

According to one aspect of the technology described herein, a compressor bleed apparatus includes: a compressor comprising one or more rotors mounted for rotation about a central axis and enclosed in a compressor casing; a bleed slot passing through the compressor casing; an outer wall defining, in cooperation with the compressor casing, a plenum surrounding the compressor casing; and at least one offtake pipe communicating with the plenum. At least one of the plenum and the bleed slot has a non-axisymmetric structure.

According to another aspect of the technology described herein, a method is provided of bleeding air from a compressor including one or more rotors mounted for rotation about a central axis and enclosed in a compressor casing. The method includes: bleeding air from the compressor casing into a plenum surrounding the compressor casing through a bleed slot and subsequently into one or more offtake pipes communicating with the plenum, wherein the air is bleed through the slot in a non-axisymmetric flow pattern, so as to produce substantially uniform static pressure around a periphery of the bleed slot.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
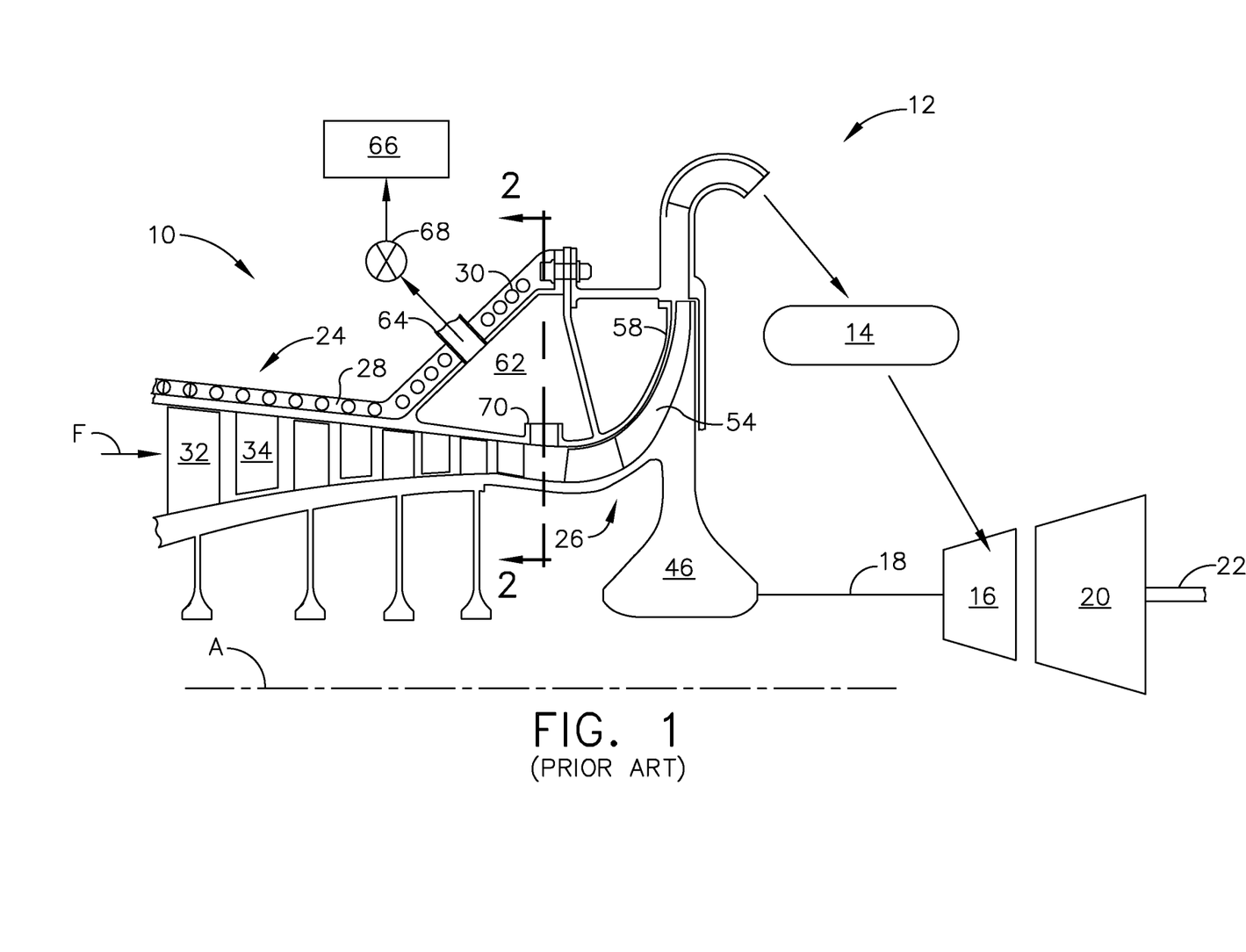
FIG. 1 is a half-sectional, schematic view of a gas turbine engine that incorporates a prior art compressor apparatus.
Figure 2:
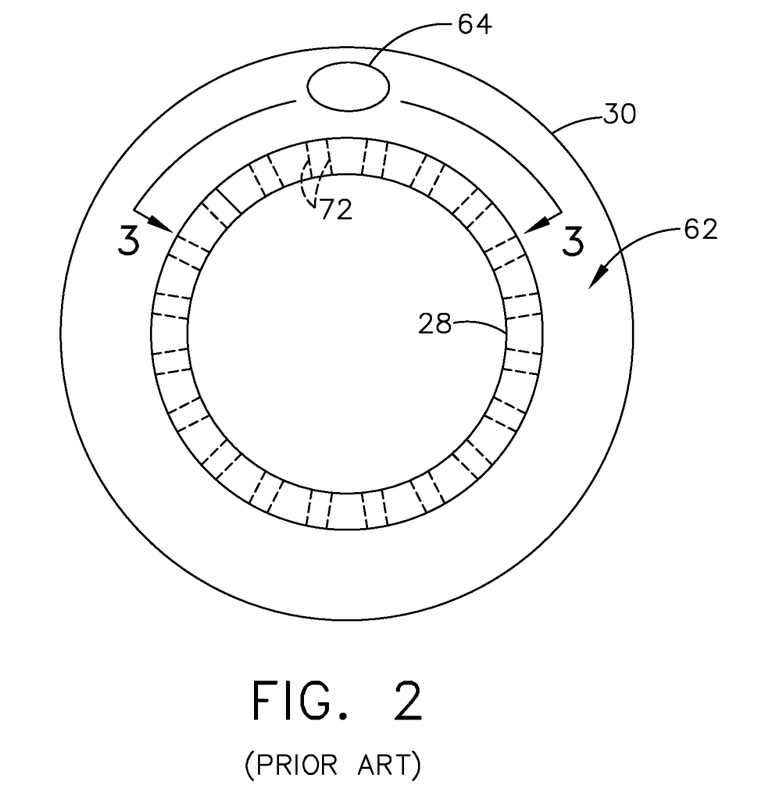
FIG. 2 is a schematic view taken along lines 2-2 of FIG. 1.
Figures 3, 6:
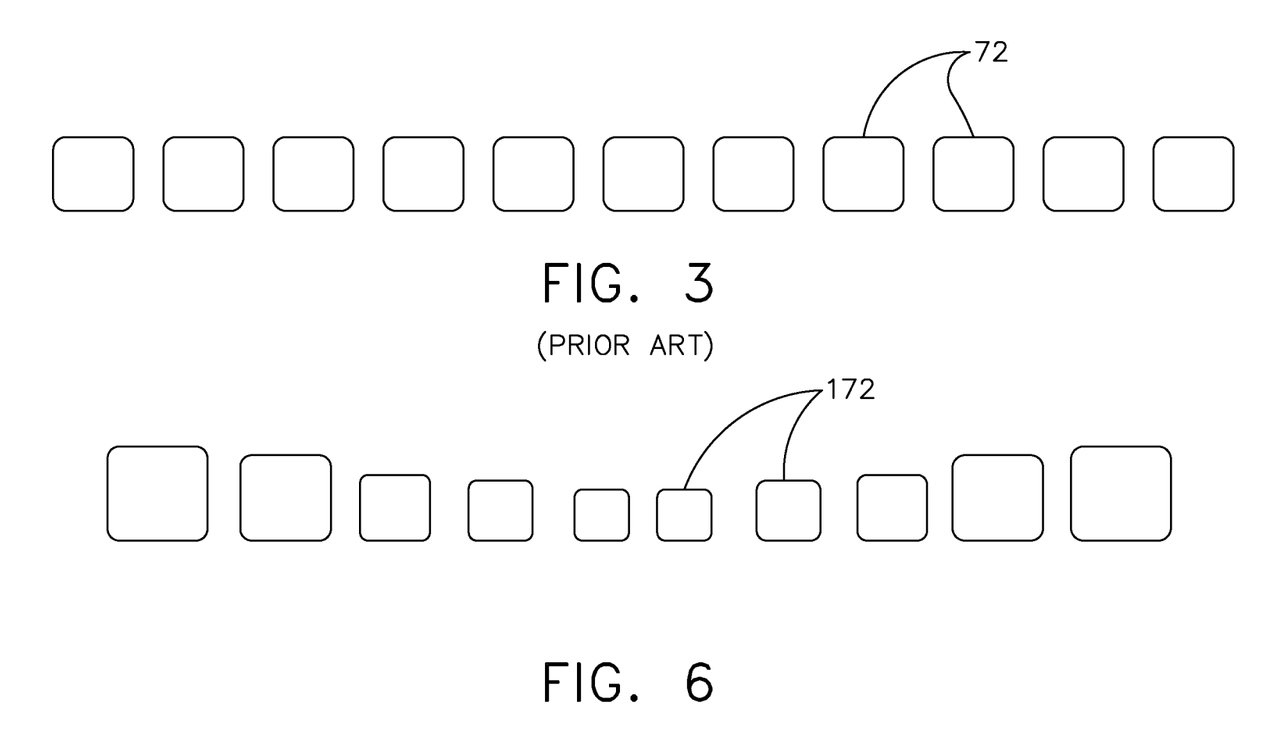
FIG. 3 is a view taken along lines 3-3 of FIG. 2, showing a prior art bleed slot configuration.
FIG. 6 is a view taken along lines 6-6 of FIG. 5, showing an exemplary bleed slot configuration.

Referring to the drawings wherein identical reference numerals denote the same elements throughout the various views, FIGS. 1-3 depict an exemplary prior art compressor 10. In the illustrated example, the compressor 10 is incorporated into a gas turbine engine 12 with a central longitudinal axis "A" and including in sequential flow sequence, the compressor 10, a combustor 14, and a gas generator turbine 16 (the combustor 14 and compressor 16 are shown schematically). As used herein, the terms "axial" and "longitudinal" both refer to a direction parallel to the axis A, while "radial" refers to a direction perpendicular to the axial direction, and "tangential" or "circumferential" refers to a direction mutually perpendicular to the axial and radial directions. As used herein, the terms "forward" or "front" refer to a location relatively upstream in an air flow passing through or around a component, and the terms "aft" or "rear" refer to a location relatively downstream in an air flow passing through or around a component. The direction of this flow is shown by the arrow "F" in FIG. 1. These directional terms are used merely for convenience in description and do not require a particular orientation of the structures described thereby.

The compressor 10 provides compressed air that passes primarily into the combustor 14 to support combustion and partially around the combustor 14 where it is used to cool both the combustor liners and turbomachinery further downstream. Fuel is introduced into the forward end of the combustor 14 and is mixed with the air in a conventional fashion. The resulting fuel-air mixture flows into the combustor 14 where it is ignited to generate hot combustion gases. The hot combustion gases are discharged to the gas generator turbine 16 where they are expanded so that energy is extracted. The gas generator turbine 16 drives the compressor 10 through a shaft 18. In the illustrated example, the engine 12 is a turboshaft engine and a work turbine (also called a power turbine) 20 is located downstream of the gas generator turbine 16 and coupled to an output shaft 22 which can be connected to a mechanical load. However, the principles described herein are equally applicable to any compressor. For example, they may apply to a compressor driven by an external prime mover.

The compressor 10 includes an upstream portion 24 and a downstream portion 26. An annular compressor casing 28 surrounds the entire compressor 10. As viewed in cross-section, an aft portion of the compressor casing 28 includes an outer skirt 30 that diverges radially outward from the main body of the compressor casing 28, forming a "Y" shape when viewed in half-section. The upstream portion 24 of the compressor 10 is configured for axial fluid flow and may also be referred to as an axial-flow portion or simply an axial portion. It includes a number of stages, each of which includes a row of rotating airfoils or blades 32 and a row of stationary airfoils or vanes 34. The vanes 34 serve to turn the airflow exiting an upstream row of blades 32 before it enters the downstream row of blades 32. It is noted that this compressor 10 is merely an example and the principles described herein are applicable to any type of compressor, including, for example, a pure axial compressor.

The downstream portion 26 of the compressor 10 is configured for centrifugal or mixed axial-centrifugal fluid flow and may be referred to as a centrifugal-flow portion or simply a centrifugal portion.

The downstream portion 26 includes an impeller 46 mounted for rotation with the shaft 18. An annular array of airfoil-shaped impeller blades 54 extend outward from the impeller 46. The impeller blades 54 are configured in terms of their dimensions, cross-sectional shape, orientation, spacing, and other parameters (in accordance with conventional practice) to provide an incremental pressure increase to the air flowing past them as the impeller 46 rotates.

An annular shroud assembly 58 surrounds the impeller 46. A forward end of the shroud assembly 58 adjoins the compressor casing 28, and the compressor casing 28, its outer skirt 30, and the shroud assembly 58 collectively define the boundaries of an annular plenum 62.

One or more offtake pipes 64 communicate with the plenum 62. The offtake pipes 64 are configured to deliver bleed air to an engine or aircraft system, shown schematically in the box labeled 66, where it may be used for various purposes such as cooling, actuation, or environmental control. This flow may be controlled or modulated by appropriate equipment such as the valve 68 shown schematically.

The compressor casing 28 includes a bleed slot 70 configured as an annular array of individual apertures 72 disposed around its circumference, which are in fluid communication with the primary compressor flow path and the plenum 62. FIG. 3 illustrates a common prior art configuration of the bleed slot 70. It can be seen that the apertures 72 have a uniform shape and flow area and are equally-spaced from one another.

In operation, the presence of the chamber offtake pipe 64 causes non-uniformity in flow rate and static pressure around the circumference of the compressor casing 28. The basic reason for this is that the chamber offtake pipe 64 serves as a "pressure sink". More specifically, the mass flow through the bleed slot 70 is generally greater near the circumferential location of the offtake pipe 64, and the static pressure is generally lower near the location of the offtake pipe 64. This inverse relationship of flow and static pressure is attributable to Bernoulli's principle.

It would be possible to minimize the nonuniformity around the circumference by providing a large number of chamber offtake pipes. However in practice, this increases the part count, weight, complexity and cost of the engine and therefore usually only two or one offtake pipes are provided. This increases the non-uniform effect.

Described herein are several structures which may be incorporated into the compressor 10 shown in FIG. 1 in order to improve the uniformity of the static pressure around the circumference of the compressor casing 28. The basic principle involves making some portion of either the plenum 62 or the bleed slot 70 non-axisymmetric in such a way to compensate for the presence of the single offtake pipe 64 and to make the resulting flow as uniform as possible, with the purpose of such non-axisymmetric structure being to make the mass flow rate and static pressure substantially uniform around the circumference of the compressor casing 28.

Figure 4:
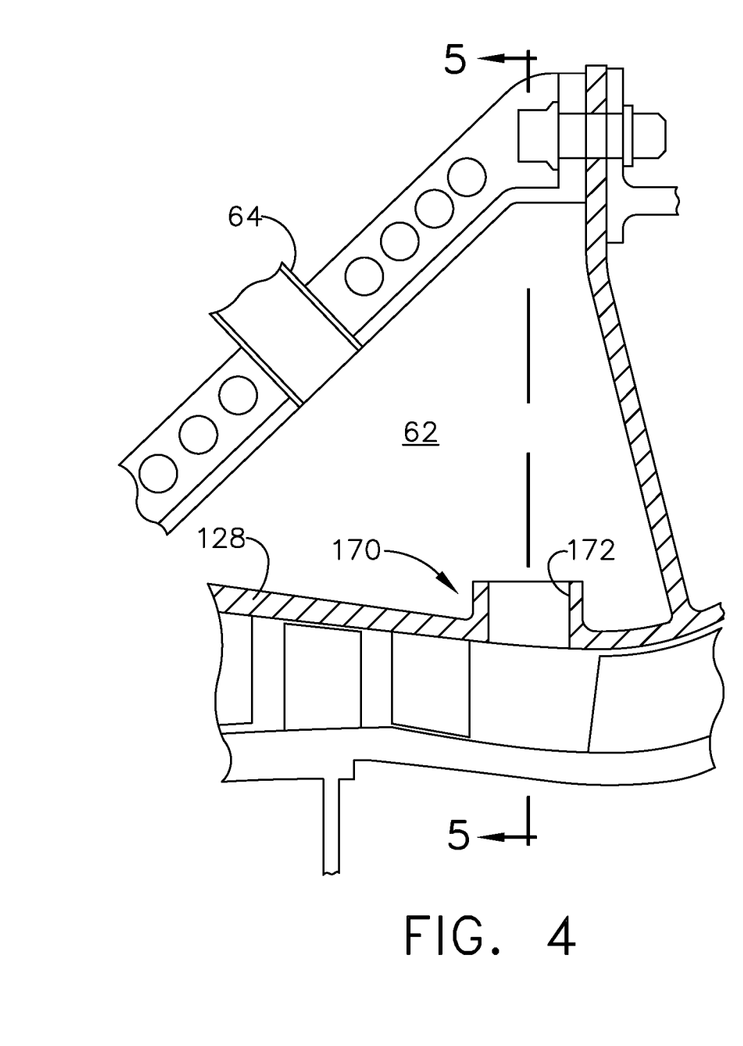
FIG. 4 is a half-sectional, schematic view of a portion of a compressor apparatus constructed in accordance with an aspect of the present invention.
Figure 5:
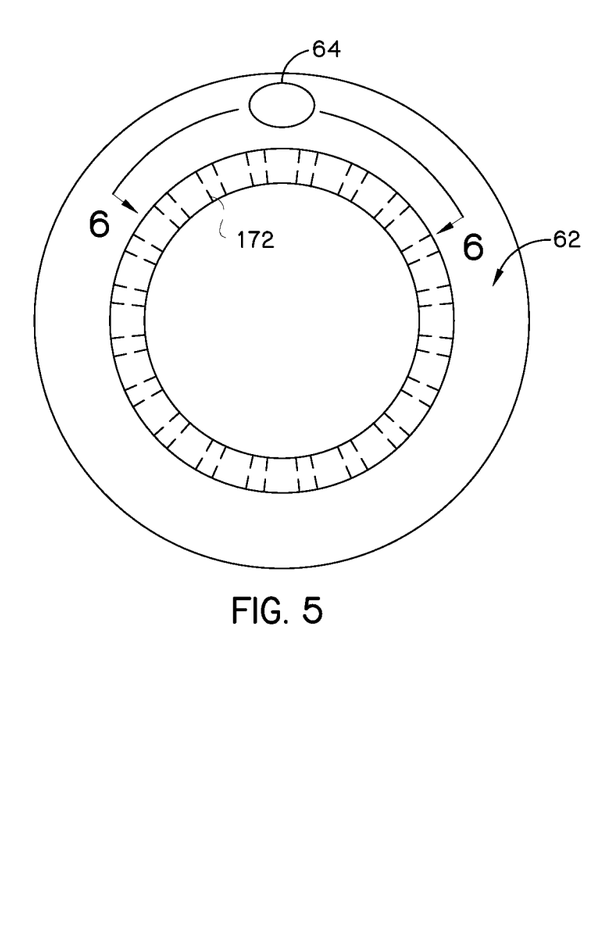
FIG. 5 is a schematic view taken along lines 5-5 of FIG. 4.

FIGS. 4-6 illustrate an exemplary compressor casing 128 that may be substituted for the compressor casing 28 described above. The compressor casing 128 includes a bleed slot 170 configured as an annular array of individual apertures 172 disposed around its circumference, which are in fluid communication with the primary compressor flow path and the plenum 62. FIG. 6 illustrates an example configuration of the apertures 172. It can be seen that the apertures 172 have different flow areas, with the apertures 172 located around most of the circumference of the compressor casing 128 having a uniform first flow area, and the apertures 172 near or at the circumferential location of the offtake pipe 64 having a second flow area smaller than the first flow area. This reduction in flow area is effective to reduce the flow rate through the apertures 172 and increase the static pressure at their circumferential locations, thereby compensating for the presence of the offtake pipe 64. In the illustrated example, the flow area of the apertures 172 tapers or progressively increases from the smallest or second flow area in the apertures 172 located further away from the circumferential location of the offtake pipe 64.

While the apertures 172 shown in FIG. 6 are square or rectangular with radiused corners, it will be understood that the principles described herein are applicable to any aperture geometry (e.g. rectangular, circular, oval, etc.). The size and/or shape of the apertures 172 may be changed to effect the desired change in flow area.

Each of the apertures 172 shown in FIG. 6 has a constant flow area, or stated another way, is a prismatic shape without throttling or diffusing effect. However, the flow rate and/or static pressure through the apertures 172 may be manipulated by varying the flow area along the length of the aperture 172.

Figure 7:
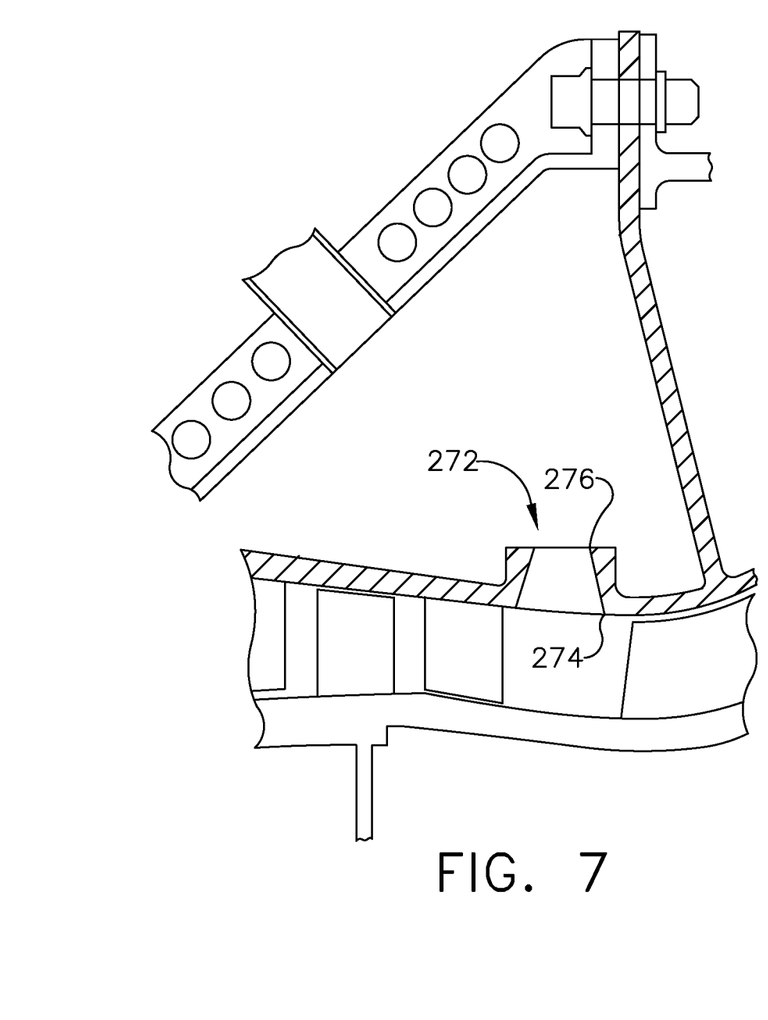
FIG. 7 is a half-sectional, schematic view of a portion of a compressor apparatus constructed in accordance with another aspect of the present invention.

For example, FIG. 7 illustrates an alternative aperture 272 having a nozzle shape. More specifically, the flow area of an inlet 274 of the aperture 272 is greater than the flow area of an outlet 276 of the aperture 272. In operation, this aperture 272 will act as a nozzle, increasing the velocity and reducing the static pressure of the air flowing through it.

Figure 8:
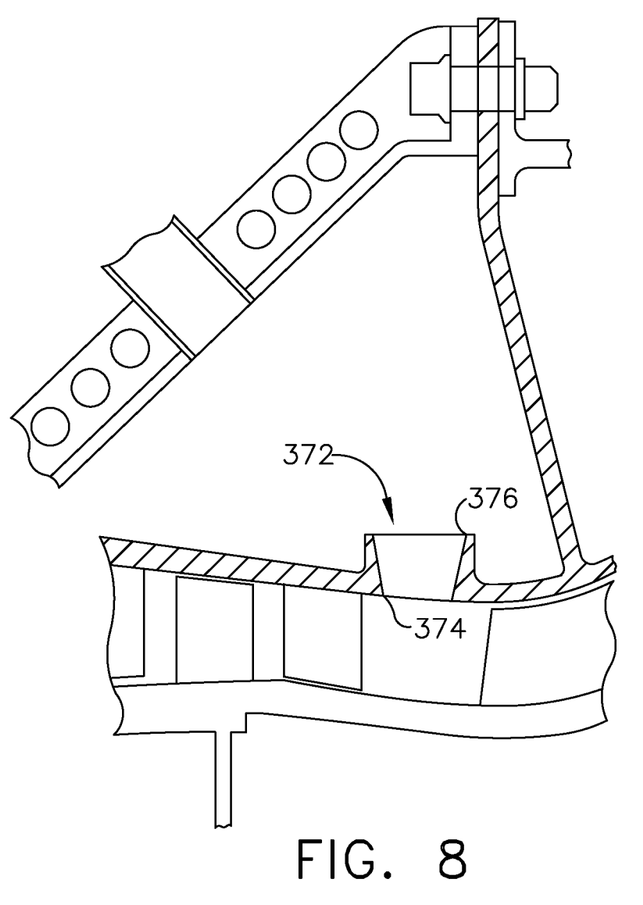
FIG. 8 is a half-sectional, schematic view of a portion of a compressor apparatus constructed in accordance with another aspect of the present invention.

As another example, FIG. 8 illustrates another alternative aperture 372 having a diffuser shape. More specifically, the flow area of an inlet 374 of the aperture 372 is less than the flow area of an outlet 376 of the aperture 372. In operation, this aperture 372 will act as a diffuser, decreasing the velocity and reducing the static pressure of the air flowing through it.

It will be understood that a combination of the apertures shown in FIGS. 6-8 may be used to effect the desired static pressure pattern. For example, locations around the compressor casing 128 distant from the offtake pipe 64 may use constant-area apertures 172 as shown in FIG. 6, and locations near the offtake pipe 64 may use diffuser-shaped apertures 372 as shown in FIG. 8. As another example, locations around the compressor casing 128 distant from the offtake pipe 64 may use nozzle-shaped apertures 272 as shown in FIG. 7, and locations near the offtake pipe 64 may use constant-area apertures 172 as shown in FIG. 6.

As a general principle, the bleed slot would have a smaller flow area and/or a diffuser shape in the region of the chamber offtake pipe 64. The exact configuration of aperture sizes and shapes required to achieve the desired static pressure uniformity may be determined on a case-by-case basis, for example using commercially-available computational fluid dynamics software to analyze the flow and pressure patterns within the plenum 62.

It will be understood that the non-axisymmetric configuration may also be applied to a continuous slot rather than a slot comprising an array of individual apertures.

Figure 9:
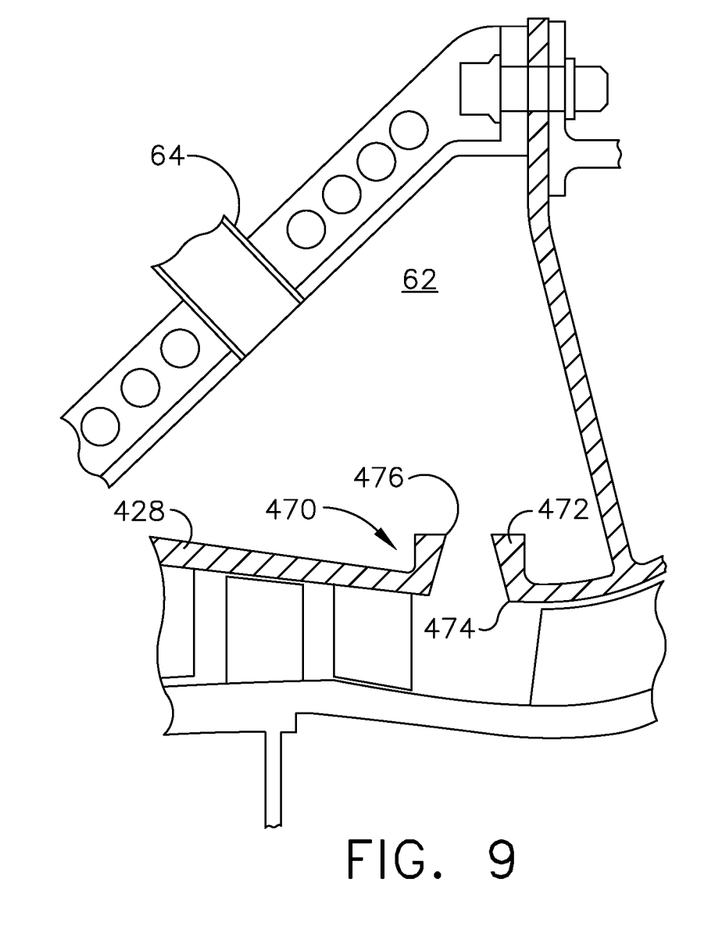
FIG. 9 is a half-sectional, schematic view of a portion of a compressor apparatus constructed in accordance with another aspect of the present invention.
Figure 10:
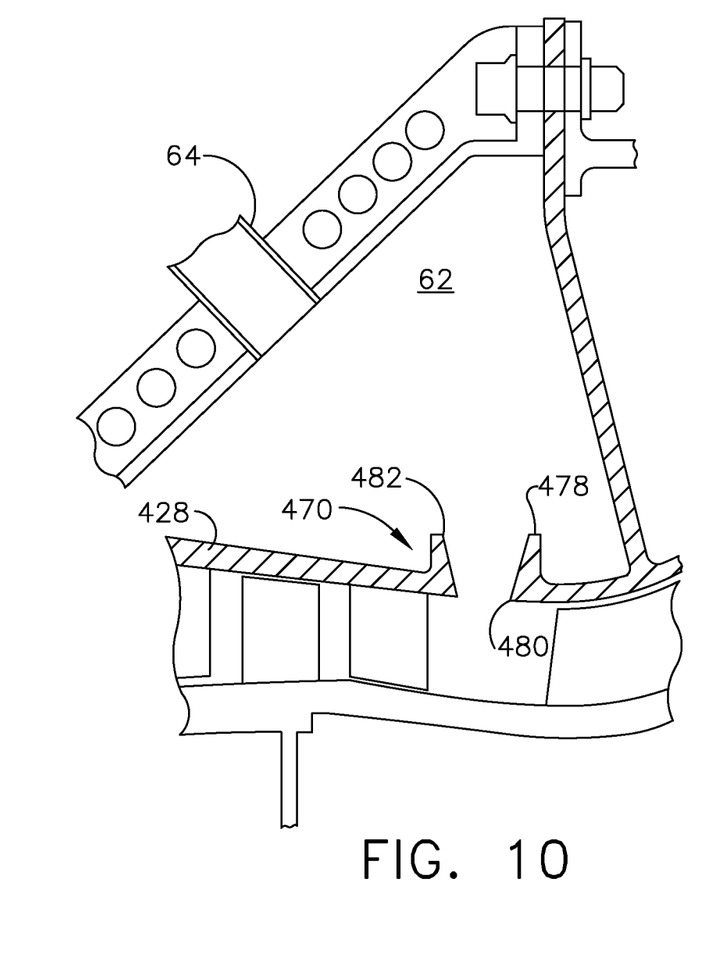
FIG. 10 is a half-sectional, schematic view of a portion of a compressor apparatus constructed in accordance with another aspect of the present invention.

For example, FIGS. 9 and 10 illustrate an exemplary compressor casing 428 that may be substituted for the compressor casing 28 described above. The compressor casing 428 includes a continuous annular bleed slot 470 disposed around its circumference, which is in fluid communication with the primary compressor flow path and the plenum 62. The annular bleed slot 470 may incorporate the variations in its overall flow area (i.e. width) as well as its shaping around the circumference of the compressor casing 428.

FIG. 9 shows a first portion 472 of the bleed slot 470 having a nozzle shape. More specifically, the flow area of an inlet 474 of the first portion 472 is greater than the flow area of an outlet 476 of the first portion 472. In operation, this portion of the bleed slot 470 will act as a nozzle, increasing the velocity and reducing the static pressure of the air flowing through it.

FIG. 10 illustrates a second portion 478 of the bleed slot 470 having a diffuser shape. More specifically, the flow area of an inlet 480 of the second portion 478 is less than the flow area of an outlet 482 of the second portion 478. In operation, this portion of the bleed slot 470 will act as a diffuser, decreasing the velocity and reducing the static pressure of the air flowing through it.

It will be understood that a combination of the bleed slot shapes shown in FIGS. 9 and 10 may be used to effect the desired static pressure pattern. For example, locations around the compressor casing 428 distant from the offtake pipe 64 may use nozzle-shaped portions 472 as shown in FIG. 9, and locations near the offtake pipe 64 may use diffuser-shaped portions 478 as shown in FIG. 10.

Figure 16:
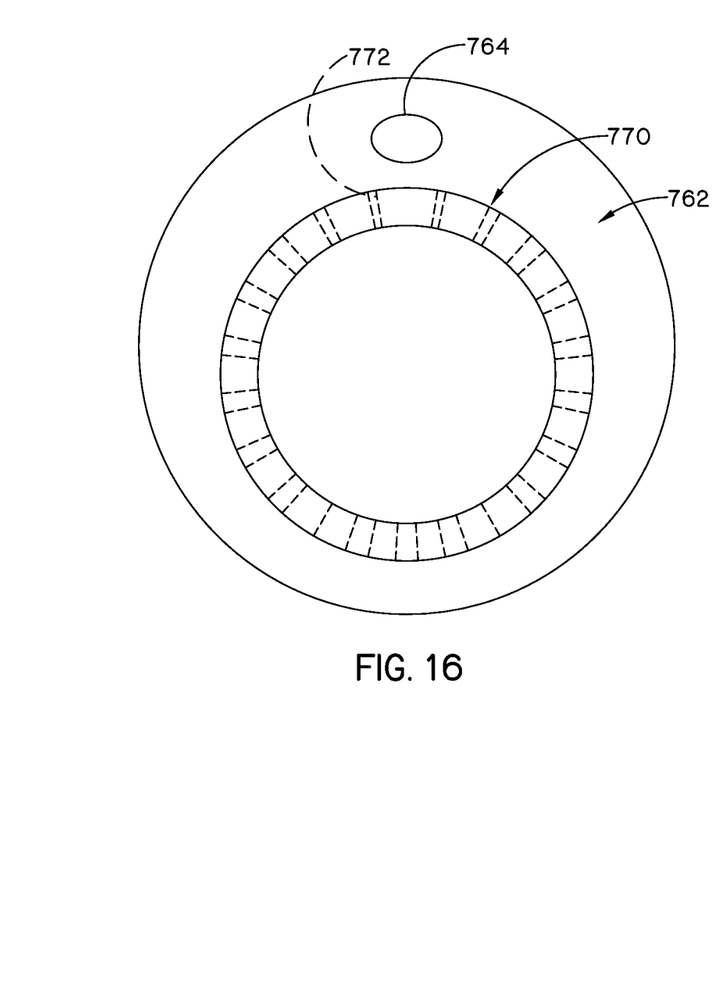
FIG. 16 is a schematic front elevational view of a portion of a compressor apparatus constructed in accordance with another aspect of the present invention.

In addition to or as an alternative to the bleed slot shaping/and/or sizing described above, the contours of the plenum 62 may be varied around its circumference to effect the desired flow and or pressure distribution. As shown in FIG. 16, plenum 762 is non-axisymmetric and has a volume that varies around its circumference. In general, the plenum 762 has a larger volume in the region of the offtake pipe 764. Further, a bleed slot 770 has a non-axisymmetric structure and is configured as an annular array of individual apertures 772. The bleed slot 770 has a first flow area distant from a circumferential location of the offtake pipe 764 and a second flow area at a circumferential location of the offtake pipe 764. The second flow area is smaller than the first flow area.

Figure 11:
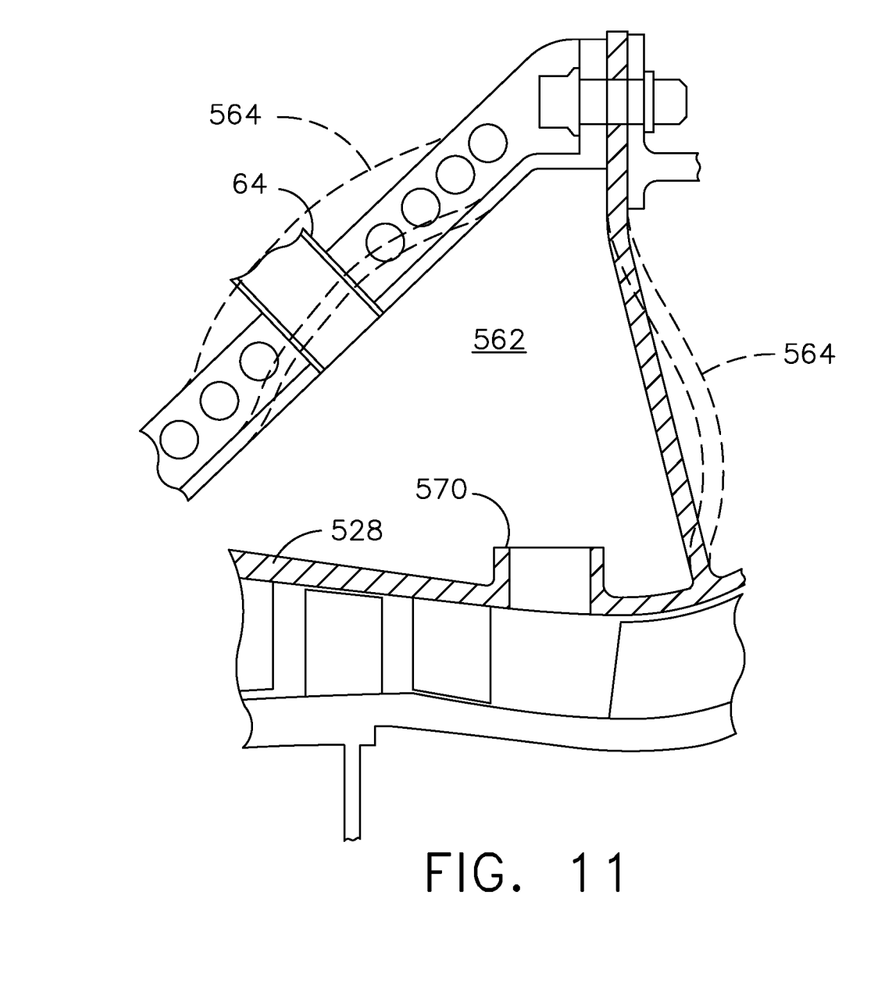
FIG. 11 is a half-sectional, schematic view of a portion of a compressor apparatus constructed in accordance with another aspect of the present invention.
Figure 12:
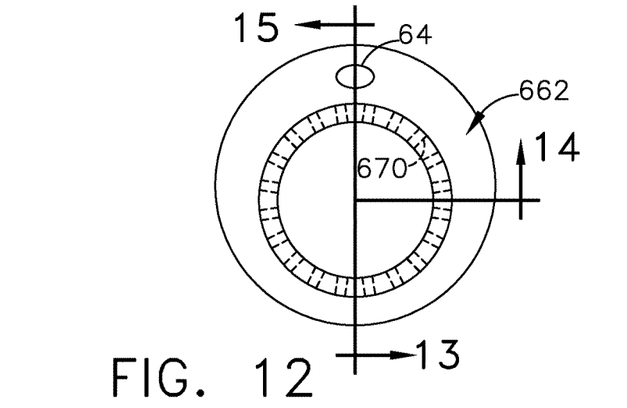
FIG. 12 is a schematic front elevational view of a portion of a compressor apparatus constructed in accordance with another aspect of the present invention.

FIG. 11 illustrates an exemplary compressor casing 528 and plenum 562 that may be substituted for the compressor casing 28 and plenum 62 described above. The compressor casing 528 includes a bleed slot 570 disposed around its circumference, in fluid communication with the primary compressor flow path and the plenum 562. The bleed slot 570 may comprise an annular array of individual apertures or may be a continuous annular slot.

The volume of the plenum 562 varies around its circumference in order to effect the desired flow and/or pressure distribution. in general, the plenum 562 would have a larger cross-sectional area (resulting in a larger local volume) in the region of the offtake pipe 64. This serves as a diffuser to offset the increased flow/reduced static pressure caused by the presence of the offtake pipe 64. In the example shown in FIG. 11, the majority of the plenum 562 has the shape and size depicted by the solid lines, while areas located in the vicinity of the offtake pipe 64 have a larger volume as shown by the dashed lines. Stated another way, the plenum 562 may incorporate one or more outward bulges 564 near the circumferential location of the offtake pipe 64.

FIGS. 12-15 illustrate another exemplary compressor casing 628 and plenum 662 that may be substituted for the compressor casing 28 and plenum 62 described above. The compressor casing 628 includes a bleed slot 670 disposed around its circumference, in fluid communication with the primary compressor flow path and the plenum 662. The bleed slot 670 may comprise an annular array of individual apertures or may be a continuous annular slot.

Figure 13:
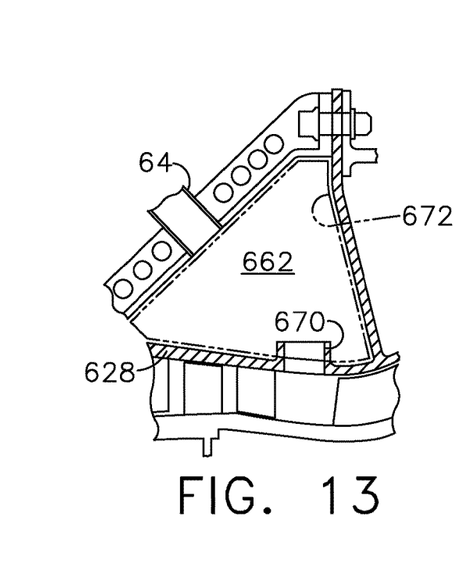
FIG. 13 is a schematic half-sectional view taken along line 13 of FIG. 12.
Figure 15:
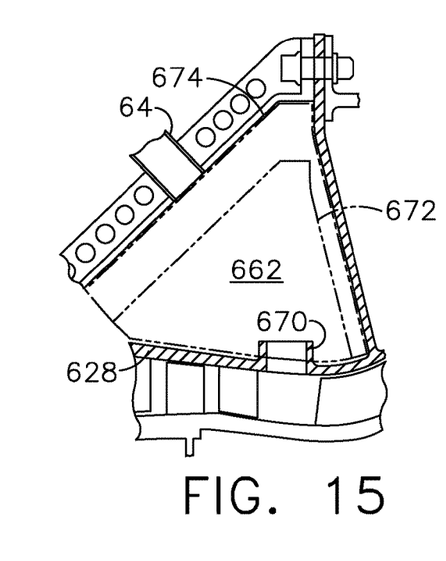
FIG. 15 is a schematic half-sectional view taken along line 15 of FIG. 12.

Similar to the plenum 562 described above, the volume of the plenum 662 varies around its circumference in order to effect the desired flow and/or pressure distribution. In general, the plenum 662 would have a larger cross-sectional area (resulting in a larger local volume) in the region of the offtake pipe 64. This serves as a diffuser to offset the increased flow/reduced static pressure caused by the presence of the offtake pipe 64. In this example, the plenum 662 has a minimum local volume at locations distant from the offtake pipe 64, as shown in FIG. 13. The boundaries of the plenum 662 are marked by a dashed line, labeled 672, as a reference. The plenum 662 has a maximum local volume in areas located in the vicinity the offtake pipe 64, as shown in FIG. 15, marked by a dashed line labeled 674. It can be seen that the local volume 674 is greater than the local volume 672. In this example, both the radial and axial dimensions of the plenum 662 are larger near the offtake pipe 64; however it will be understood that any of the dimensions could be varied to achieve a change in local volume.

Figure 14:
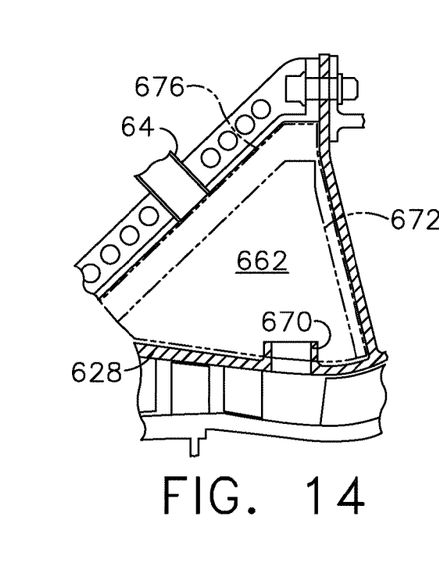
FIG. 14 is a schematic half-sectional view taken along line 14 of FIG. 12.

The plenum 662 may be contoured so as to achieve a smooth transition between the minimum local volume and maximum local volume. For example, FIG. 14 shows a portion of the plenum 662 located intermediate the section shown in FIG. 13 in FIG. 15, and having an intermediate local volume, marked by dashed line labeled 676.

The present invention has advantages over the prior art. In particular, it will increase the uniformity of bleed air static pressure around the perimeter of the compressor casing. This will improve compressor operability and stall margin.

The foregoing has described a compressor bleed apparatus. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A compressor bleed apparatus, comprising: a compressor comprising one or more rotors mounted for rotation about a central axis and enclosed in a compressor casing; a bleed slot passing through the compressor casing; an outer wall defining, in cooperation with the compressor casing, a plenum surrounding the compressor casing; a single offtake pipe extending through the outer wall and communicating with the plenum, the outer wall having no other offtake pipes extending therethrough; the plenum and the outer wall have a non-axisymmetric structure about the central axis and the plenum is not centered about the central axis, the plenum with a first volume and a first shape at a first location distant and opposite from a circumferential location of the single offtake pipe and a second volume and a second shape at a second location near and surrounding the circumferential location of the single offtake pipe, the second volume being greater than the first volume, the first shape and the second shape being different; wherein the bleed slot comprises a plurality of individual apertures, each of the plurality of individual apertures communicating with a varying local plenum volume surrounding and in a vicinity of each of the plurality of individual apertures, the plurality of individual apertures with varying local volumes extending completely around an entire circumference of the compressor casing; wherein the plurality of individual apertures includes all the individual apertures extending completely around the entire circumference of the compressor casing; wherein a size of each of the plurality of individual aperture progressively increases from a first flow area of a first aperture to a second flow area of a second aperture, the first flow area being the smallest flow area of all the plurality of individual apertures, and the second area being the largest flow area of all the plurality of individual apertures; wherein the first aperture is disposed near the circumferential location of the single offtake pipe and the second aperture is disposed opposite the first aperture; wherein the first aperture has a diffuser shape; wherein the outer wall incorporates a first outward bulge near a circumferential location of the single offtake pipe and the compressor casing incorporates a second outward bulge near the same circumferential location of the single offtake pipe, the first outward bulge and the second outward bulge not being located in the offtake pipe.

2. The compressor bleed apparatus of claim 1 wherein: at least one of the plurality of individual apertures has a flow area which increases or decreases in a direction from an inlet of the at least one of the plurality of individual apertures to an outlet of the at least one of the plurality of individual apertures.

3. The compressor bleed apparatus of claim 1 wherein the shape of each of the plurality of individual apertures other than the first aperture is selected from the group consisting of a nozzle, a diffuser, and a constant area shape.

4. A compressor bleed apparatus, comprising: a compressor comprising: an upstream portion having an axial-flow compressor, and a downstream portion having a centrifugal-flow compressor; and one or more rotors mounted for rotation about a central axis and enclosed in a compressor casing, the compressor casing having a main body and an outer skirt that diverges radially outward from the main body; a bleed slot passing through the main body of the compressor casing, the bleed slot being disposed between the upstream and downstream portions; an annular plenum defined by the main body, outer skirt, and a shroud assembly adjoining the compressor casing; a single offtake pipe communicating with the annular plenum, the single offtake pipe extending through the outer skirt, the outer skirt having no other offtake pipes extending therethrough; wherein the annular plenum and the outer skirt have a non-axisymmetric structure about the central axis with the annular plenum having a first volume and a first shape at a first location distant and opposite from a circumferential location of the single offtake pipe and a second volume and a second shape at a second location near and surrounding the circumferential location of the single offtake pipe, the second volume being greater than the first volume and wherein the first shape and the second shape being different, where the plenum is not centered about the central axis, and wherein the bleed slot comprises a plurality of individual apertures, each of the plurality of individual apertures communicating with a varying local plenum volume surrounding and in a vicinity of each of the plurality of individual apertures, the plurality of individual apertures with varying local volumes extending completely around an entire circumference of the compressor casing; wherein the plurality of individual apertures includes all the individual apertures extending completely around the entire circumference of the compressor casing; wherein a size of each of the plurality of individual aperture progressively increases from a first flow area of a first aperture to a second flow area of a second aperture, the first flow area being the smallest flow area of all the plurality of individual apertures, and the second area being the largest flow area of all the plurality of individual apertures; wherein the first aperture is disposed near the circumferential location of the single offtake pipe and the second aperture is disposed opposite the first aperture; wherein the first aperture has a diffuser shape; wherein the outer skirt incorporates a first outward bulge near a circumferential location of the single offtake pipe and the compressor casing incorporates a second outward bulge near the same circumferential location of the single offtake pipe, the first outward bulge and the second outward bulge not being located in the offtake pipe.

5. The compressor bleed apparatus of claim 4 wherein the shape of each of the plurality of individual apertures other than the first aperture is selected from the group consisting of a nozzle, a diffuser, and a constant area shape.

6. The compressor bleed apparatus of claim 4 wherein:
at least one of the plurality of individual apertures has a flow area which increases or decreases in a direction from an inlet of the at least one of the plurality of individual apertures to an outlet of the at least one of the plurality of individual apertures.

7. A method of bleeding air from a compressor comprising one or more rotors mounted for rotation about a central axis and enclosed in a compressor casing, the method comprising: bleeding air from the compressor casing into a plenum surrounding the compressor casing through a plurality of individual apertures and subsequently into a single offtake pipe communicating with the plenum, the single offtake pipe extending through an outer wall, the outer wall defining, in cooperation with the compressor casing, the plenum, the outer wall having no other offtake pipes extending therethrough, the plenum at a first location distant and opposite from a circumferential location of the single offtake pipe having a first volume and first shape and the plenum at a second location near and surrounding the circumferential location of the single offtake pipe having a second volume greater than the first volume and a second shape and wherein the first shape and the second shape are different, wherein the air is bled through the plurality of individual apertures in a non-axisymmetric flow pattern through the plenum, the plenum and the outer wall being non-axisymmetric about the central axis and the plenum not being centered about the central axis, wherein each of the plurality of individual apertures communicates with a varying local plenum volume surrounding and in a vicinity of each of the plurality of individual apertures, the plurality of individual apertures with varying local volumes extending completely around an entire circumference of the compressor casing; wherein the plurality of individual apertures includes all the individual apertures extending completely around the entire circumference of the compressor casing; wherein a size of each of the plurality of individual aperture progressively increases from a first flow area of a first aperture to a second flow area of a second aperture, the first flow area being the smallest flow area of all the plurality of individual apertures, and the second area being the largest flow area of all the plurality of individual apertures; wherein the first aperture is disposed near the circumferential location of the single offtake pipe and the second aperture is disposed opposite the first aperture; wherein the first aperture has a diffuser shape; wherein the outer wall incorporates a first outward bulge near a circumferential location of the single offtake pipe and the compressor casing incorporates a second outward bulge near the circumferential location of the single offtake pipe, the first outward bulge and the second outward bulge not being located in the offtake pipe.

8. The method of claim 7 wherein at least one of the individual apertures incorporates at least one portion having a flow area which increases or decreases in a direction from an inlet of the at least one of the individual apertures to an outlet of the at least one of the individual apertures.

9. The method of claim 7 wherein the shape of each of the plurality of individual apertures other than the first aperture is selected from the group consisting of a nozzle, a diffuser, and a constant area shape.

* * * * *